United States Patent [19]
Lipo et al.

[11] Patent Number: 5,459,385
[45] Date of Patent: Oct. 17, 1995

[54] VARIABLE RELUCTANCE DRIVE SYSTEM

[75] Inventors: Thomas A. Lipo; Feng Liang, both of Madison, Wis.

[73] Assignee: Electric Power Research Institute, Inc., Palo Alto, Calif.

[21] Appl. No.: 173,766

[22] Filed: Dec. 27, 1993

Related U.S. Application Data

[62] Division of Ser. No. 884,162, May 18, 1992, Pat. No. 5,376,851.

[51] Int. Cl.⁶ .............................. H02P 1/18; H02K 1/00
[52] U.S. Cl. ..................... 318/701; 310/179; 310/168; 310/184; 318/254
[58] Field of Search .................. 310/49 R, 155, 310/67 R, 168, 72, 135, 197, 162, 184–185, 179; 318/254, 138, 439, 701

[56] References Cited

U.S. PATENT DOCUMENTS

| | | | |
|---|---|---|---|
| 4,081,703 | 3/1978 | Madsen et al. | 310/49 R |
| 4,097,754 | 6/1978 | Farr | 310/67 R |
| 4,348,605 | 9/1982 | Torok | 310/168 |
| 4,550,280 | 10/1985 | Freise | 318/701 |
| 4,631,510 | 12/1986 | Nagarkatti et al. | 336/135 |
| 4,733,117 | 3/1988 | Perrins | 310/162 |
| 4,752,707 | 6/1988 | Morrill | 310/184 |
| 4,949,573 | 9/1990 | Roberts | 310/68 R |
| 5,168,203 | 12/1992 | Tepavcevic | 318/254 |
| 5,289,107 | 2/1994 | Radun et al. | 318/701 |

*Primary Examiner*—William M. Shoop, Jr.
*Assistant Examiner*—John W. Cabeca
*Attorney, Agent, or Firm*—Leonard Bloom

[57] ABSTRACT

A variable reluctance drive system including a motor and corresponding converter for improved current commutation is described. The motor incorporates a salient pole rotor and a salient pole stator having one or more full pitch windings which operate by mutual inductance to transfer the current from the active short pitch winding following phase alignment. This increases output torque and/or speed and permits a number of simple and economical converter circuits.

37 Claims, 10 Drawing Sheets

5,459,385

VARIABLE RELUCTANCE DRIVE SYSTEM

This application is a division of application Ser. No. 07/884,162, filed May 18, 1992, now U.S. Pat. No. 5,376,851.

BACKGROUND OF THE INVENTION

1. Field of the invention

The present invention relates to variable reluctance machines and, more particularly, to a high specific output variable reluctance drive system incorporating a motor having one or two full-pitch windings for improving current commutation, and a special purpose solid state power converter.

2. Description of the Background

In variable reluctance motors, torque is generated by a rotor and stator which tend to align themselves in order to reach a position of minimum magnetic reluctance. Such motors are simple, efficient, easily controlled, inexpensive, and safe. As a result, there have been significant efforts to develop commercial applications. One evolving application is the stepping motor, which delivers an incremental rotation as the result of a pulsed input. Stepping motors are now widely used in microprocessor and digital control systems, and other systems requiring a low output incremental drive.

Variable reluctance motors have also found limited use in higher power applications such as fan drives, pumps, traction systems, motion control systems, appliances, and general purpose variable speed drives. However, comparatively few industrial applications presently exist for higher power variable reluctance motors. Such industrial needs are satisfied by the more conventional DC and AC induction machines. This is because variable reluctance motors have a special problem: current commutation.

In a continuous drive variable reluctance motor, the current in each phase should be decreased to zero rapidly when the rotor becomes aligned with that phase. This prevents the development of negative torque. It is difficult to accomplish this instantaneous current reduction because the phase inductance is a maximum when the rotor is aligned with that phase. The problem is most serious when the speed of the motor is high.

The prior art uses one of the following two brute force approaches to reduce the current at alignment:

(1) a negative voltage is applied to the phase winding in order to extract the energy trapped in the magnetic field and transfer it to an external storage device such as a battery or capacitor; or (2) the phase is switched off before the rotor reaches alignment and the energy trapped in the magnetic field is dissipated in a resistor connected to the phase winding through a diode.

Unfortunately, the first technique increases the VA rating and cost of the switching device (a.k.a. converter). Also, the large back-and-forth energy flow between the motor and source causes extra motor and converter losses and creates a need for a large DC bus capacitor.

The second technique reduces the output torque and efficiency of the motor.

Such drawbacks account for the lack of commercial acceptance of switched variable reluctance motors.

It would be greatly advantageous to accomplish nearly instantaneous current reduction in a phase when the rotor is aligned with that phase without likewise increasing the cost of the converter or reducing the output torque of the motor.

SUMMARY OF THE INVENTION

It is, therefore, an object of the present invention to provide a variable reluctance motor and corresponding converter which permit an economical drive system with greater output torque and higher speed than conventional reluctance systems having equivalent frame dimensions and converter VA rating.

It is another object of the invention to improve current commutation in a variable reluctance motor using full pitch winding(s).

It is another object of the invention to eliminate the large back-and-forth energy flow between the motor and source, thereby reducing motor and converter losses and eliminating the need for a large DC bus capacitor.

The present invention accomplishes the above-described objects with a new approach wherein the current in the active phase winding is naturally transferred to another winding within the motor through mutual inductance between the two windings. This avoids the brute force approach of the prior art.

According to the present invention, the above-described and other objects are accomplished by providing a variable reluctance drive system. The system includes a motor comprising a rotor having four salient poles and a stator having six salient poles. In one embodiment, the stator is wound with three short pitch windings each comprising two short pitch coils wound around individual diametric stator poles and one full pitch winding wound around three adjacent stator poles. In a second embodiment, the stator is wound with two short pitch windings each comprising two short pitch coils wound around individual diametrically opposed stator poles and two full pitch windings each wound around a group of three different adjacent stator poles. Both embodiments improve current commutation by generating a mutual inductance between the full pitch winding(s) and the short pitch windings.

The variable reluctance drive system of the present invention also includes a converter for driving the abovedescribed motor. Five alternative embodiments of a suitable converter are disclosed. All five embodiments generally comprise a plurality of switches including a first switch leg through a fourth switch leg each connected in parallel with a DC voltage source for applying the DC output to one of the short pitch windings or full pitch winding of the above-described motor.

The converter circuits achieve a novel method of commutating the variable reluctance motor of the present invention. The method comprises a first step transferring current in the active short pitch winding to a full pitch winding when the rotor reaches phase alignment, thereby improving the turn-off process, and a second step of transferring a part of the current in the full pitch winding to the next succeeding short pitch winding to be activated, thereby improving the turn-on process.

The variable reluctance drive system of the present invention is capable of a higher power density, higher speed capacity, lower converter VA rating, and higher efficiency.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENT

Figure 1:
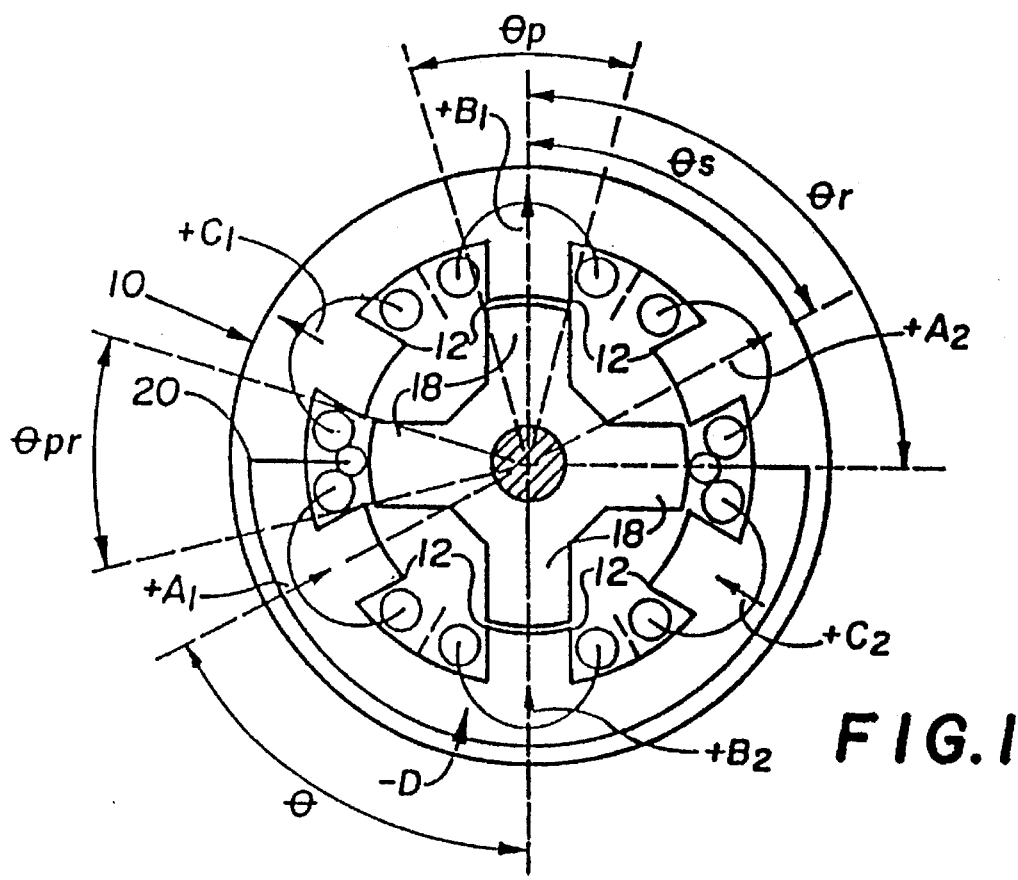
FIG. 1 is a cross-section of a preferred embodiment of the variable reluctance motor according to the present invention.

FIG. 1 shows a cross-section of a preferred embodiment of the present invention which incorporates a single full-pitch winding.

A stator 10 comprises a plurality of discrete laminated layers, each layer being punched to form six salient (or projecting) poles 12 positioned at angular intervals $\theta_s$ of $\pi/3$. Each pole 12 in FIG. 1 has a pole arc $\theta_{ps}$ of $\pi/6$.

The rotor 16 also consists of a plurality of discrete laminated layers each of which are punched to form four salient poles 18 positioned at angular intervals $\theta_r$ of $\pi/2$. Each pole 18 also has a pole arc $\theta_{pr}$ which is neither smaller than $\pi/6$ nor greater than $\pi/3$.

In the embodiment of FIG. 1, stator 10 is wound with three short pitch windings corresponding to three phases A–C. Each short pitch winding (for example, the winding of phase A) comprises two short pitch coils ($A_{1-2}$) connected in series and wound around a corresponding pair of diametric stator poles 12. The winding arrangement yields the following exemplary alternating phase sequence:

C—A—B—C—A—B

There is also a single full pitch winding 20 corresponding to a fourth phase D and wound around a group of three adjoining stator poles 12.

During motoring, a positive current is sequentially injected into each of the three short pitch windings of phases A–C some time before the inductance of the respective phase windings begins to increase. Likewise, the current is sequentially removed from each short pitch winding some time before the inductance of the respective short pitch winding begins to decrease.

There are three separate techniques for commutating the short pitch windings of phases A–C and the full pitch winding 20 of phase D to attain the above-described motoring operation. Assuming that phase B of FIG. 1 is the active short pitch winding, the three techniques may be described as follows.

1. A negative voltage is applied to the active short pitch winding (phase B in FIG. 1) and the full pitch winding 20 corresponding to phase D is short circuited. After the current in phase B reaches zero, the full pitch winding 20 of phase D can continue to be short circuited, or alternatively, may be connected to a negative voltage if the speed is very high. The full pitch winding 20 is then open circuited after the current flowing therein decreases to zero. In this manner, the main trapped energy can be visualized as being "pushed" from phase B to phase D by the negative voltage applied to phase B, and the energy in the leakage field is returned to the source.

2. A positive voltage is applied to the full pitch winding 20 and the active short pitch winding (phase B in FIG. 1) of phase B is short circuited. After the current in phase B decreases to zero, phase B is opened and the full pitch winding 20 is short circuited or connected to a negative voltage. After the current in the full pitch winding 20 decreases to zero, the full pitch winding 20 is open circuited. In this manner, the main trapped energy is "pulled" from phase B to phase D by the positive voltage connected to phase D and the energy in the leakage field is dissipated in the resistance of phase B.

3. A positive voltage is applied to the full pitch winding 20 and a negative voltage is applied to the active short pitch winding (phase B in FIG. 1) when phase B is turned off. When the current in phase B has decreased to zero, the full pitch winding 20 is short circuited or connected to a negative voltage. After the current in the full pitch winding 20 decreases to zero, the full pitch winding 20 is open circuited. In this manner, the trapped energy is both "pulled" by the positive voltage connected to phase D and "pushed" by the negative voltage connected to phase B from phase B to phase D.

Figure 2:
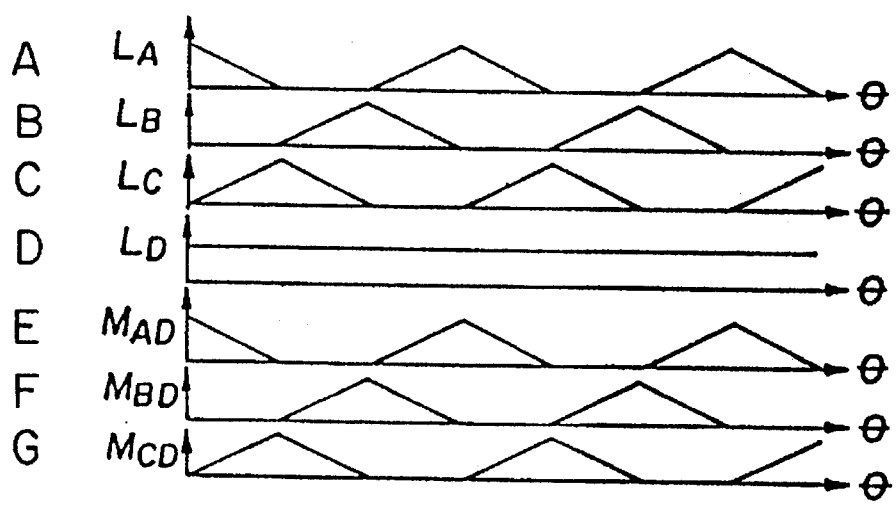
FIG. 2 shows the sequential inductance profile for the embodiment of FIG. 1.

FIG. 2 shows the sequential inductance profile for the embodiment of FIG. 1. As shown, the self-inductance of the full pitch winding 20 remains constant. Hence, the current in this winding can not produce any torque by itself. However, with this particular stator 10 and rotor 16 structure, the mutual inductances between each active short pitch winding and the full pitch winding vary with respect to rotor position. This allows the motor to attain a higher average torque output. Based on a linear model, the resulting additional torque is represented by the equation:

$$T = i_C i_D \frac{\partial M_{CD}}{\partial \theta}$$

when phase C and D are conducting.

Another factor which allows the motor of the present invention to attain a higher torque output is that the short pitch windings can be turned off later than those of conventional motors because of the improvement in turn-off performance.

Figure 3:
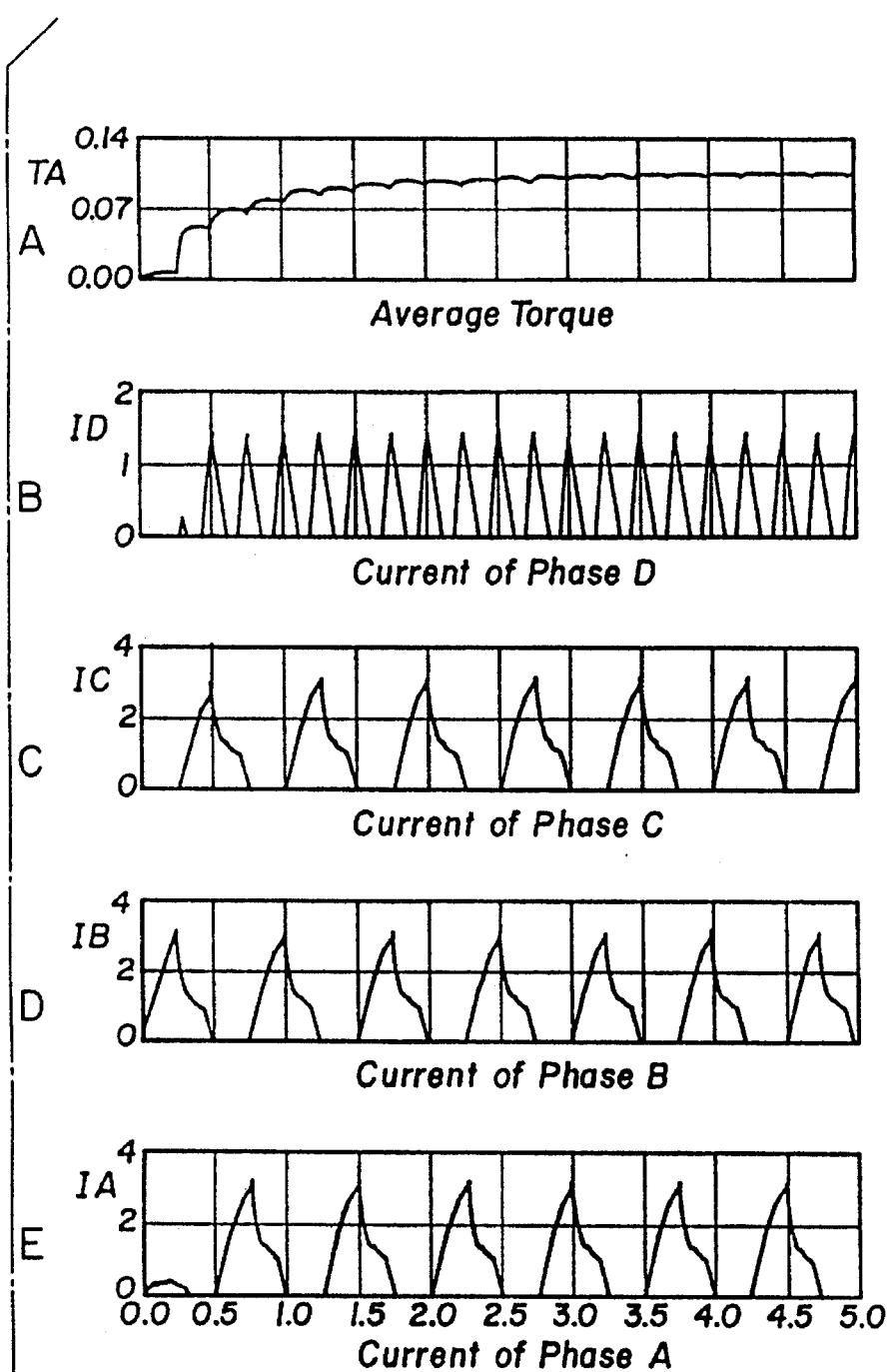
FIG. 3 is a graphical illustration of an exemplary current commutation sequence with respect to phases A–D for the embodiment of FIG. 1 at a speed of 20,000 rpm.

The operation of the embodiment of FIG. 1 using any one of the three above-described commutation techniques will now be described with reference to FIG. 3, which specifically illustrates an exemplary 20,000 rpm current commutation sequence of phases A–D. Referring to the graph corresponding to phase B, a positive current is injected into the short pitch winding of phase B some time before the inductance of phase B begins to increase. The current is subsequently removed from the short pitch winding of phase B some time before the inductance of phase B begins to decrease.

With the rotor and stator structure of FIG. 1, there exists a good magnetic coupling between the two phases B and D when the stator poles of the active short pitch winding (phase B in FIG. 1) are aligned with two of the rotor poles as shown in FIG. 1. Because of the magnetic coupling, the current in the short pitch winding of phase B is effectively transferred to the full pitch winding 20 of phase D. This remains true as long as any one of the three previously described techniques are used for commutating the short pitch windings of phases A–C and the full pitch winding 20 of phase D. Consequently, the current in phase B can be reduced more quickly following phase alignment. This is manifest in the current profiles for phases A–C shown in FIG. 3.

The turn-on performance can also be improved because part of the trapped energy is transferred to next active short pitch winding (phase C in FIG. 1) through the mutual inductance between the full pitch winding 20 and the short pitch winding.

Current commutation continues according to the repetitive sequence C—A—B—C—A—B. Each time current is almost instantly transferred to the full pitch winding 20 of phase D. The current transferred to the full pitch winding 20 of phase D will remain in phase D for a short time as it gradually decreases to zero.

Figure 5:
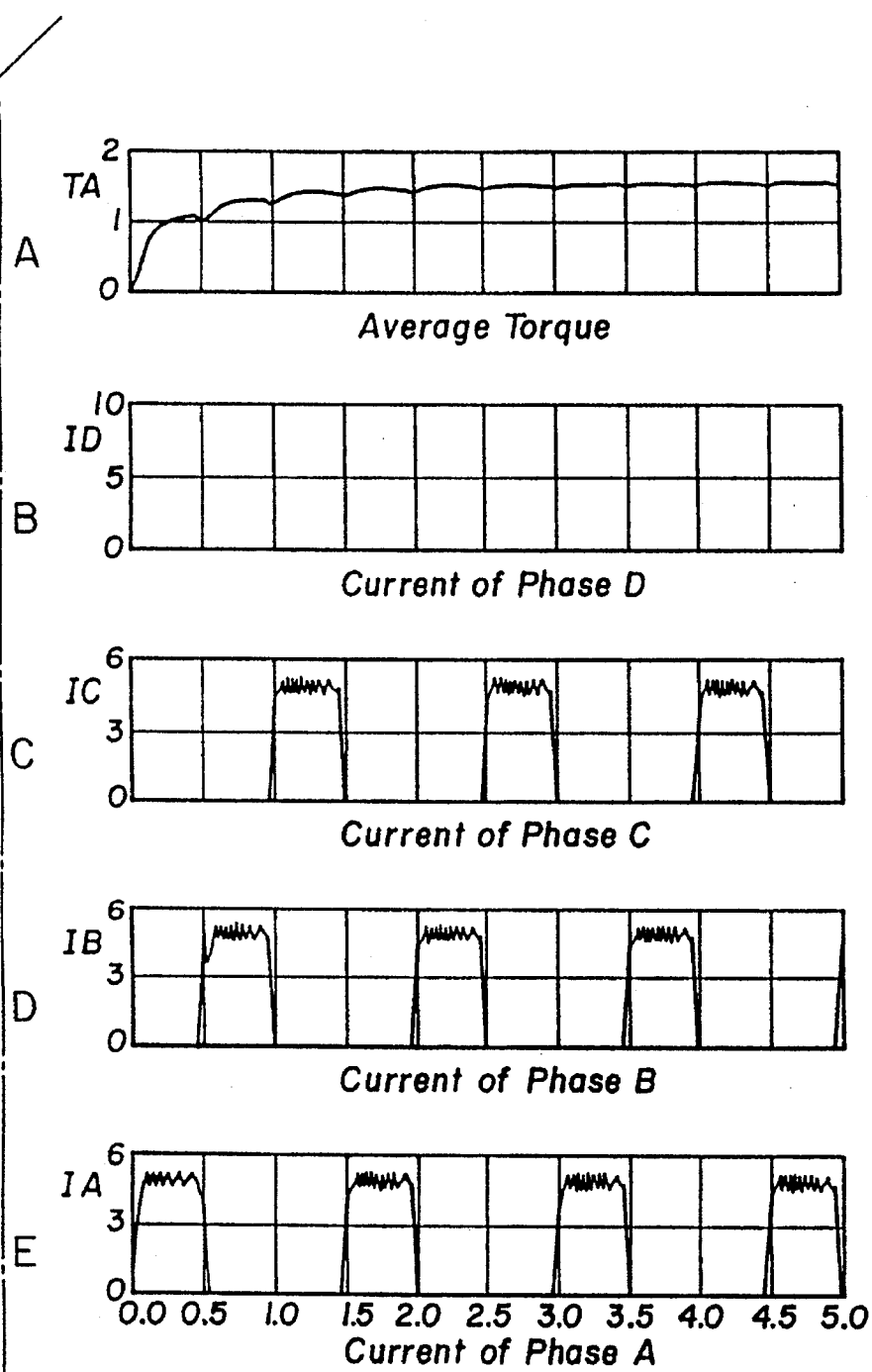
FIG. 5 is a graphical illustration of the current commutation sequence of FIG. 3 at an alternative speed of 1000 rpm.

If the VRM according to the present invention is to be operated at a speed which is below a predetermined base speed, the torque may be controlled by chopping the current applied to the short pitch windings of phases A–C to keep it at the desired value. For example, FIG. 5 illustrates an exemplary current commutation sequence for the embodiment of FIG. 1 when operated at 1000 rpm (below the predetermined base speed).

Above the predetermined base speed, the torque is controlled by controlling the conducting angle of each phase.

It is an essential feature of the present invention that the above-described stator 10 and rotor 16 structure results in a natural transfer of current from the active short pitch winding of phases A–C to the full pitch winding of phase D and on to the next sequential short pitch winding via the mechanism of mutual inductance. This natural transfer of current is an ideal alternative to the prior art brute force approaches (such as increasing the bus voltage or removing current from the active phase much prior to alignment) which attempt to extract magnetic energy outside of the machine.

Another feature of the present invention is the elimination of the back-and-forth energy flow between the motor and the power source which would occur if the magnetic energy were extracted outside of the machine. In the present invention the energy trapped in the magnetic field is retained in the motor. As a result, the DC bus capacitor can be smaller.

Figure 4:
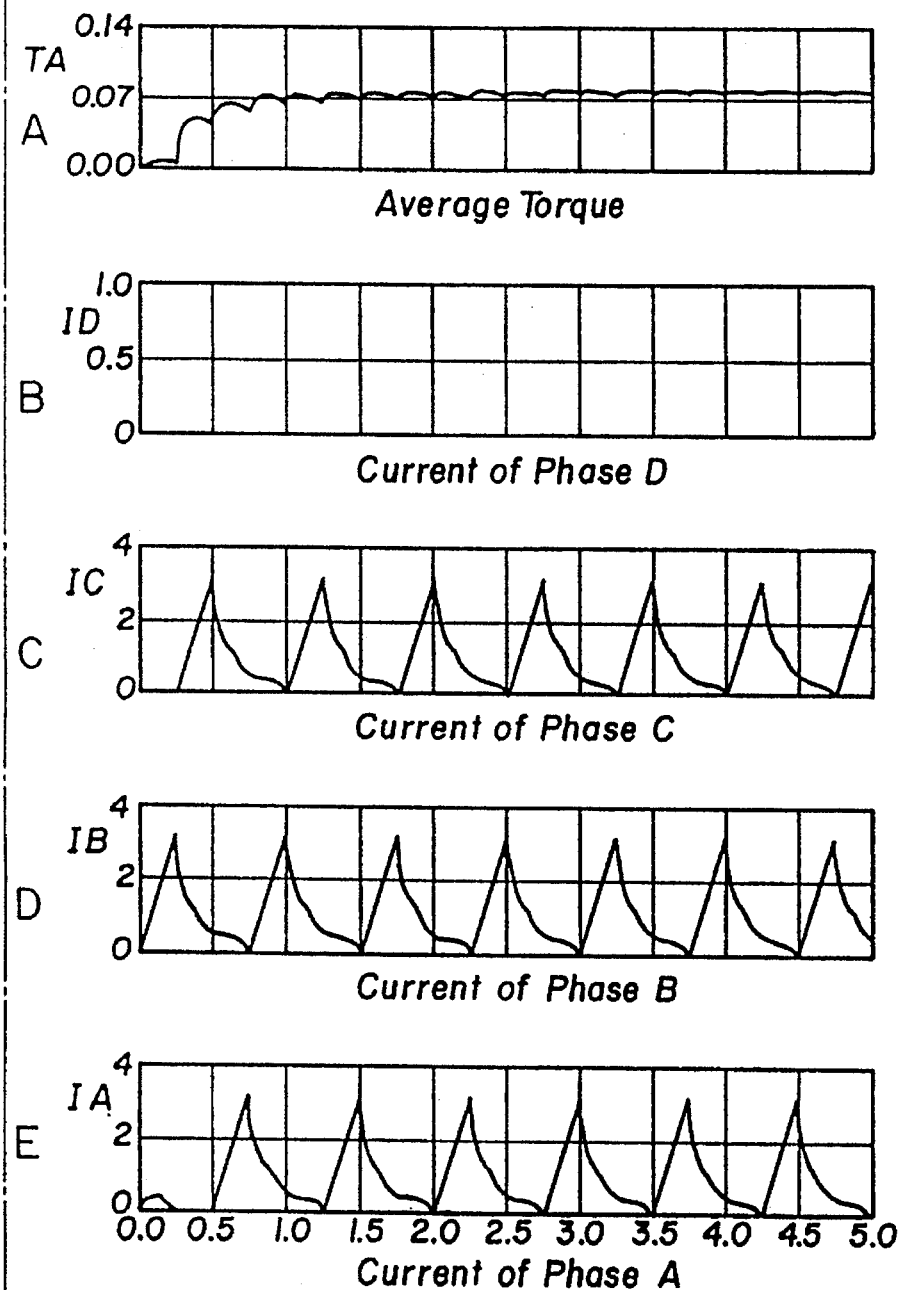
FIG. 4 illustrates a current commutation profile for a variable reluctance motor at a speed of 20,000 rpm which excludes the full-pitch winding 20 of the embodiment of FIG. 1.
Figure 6:
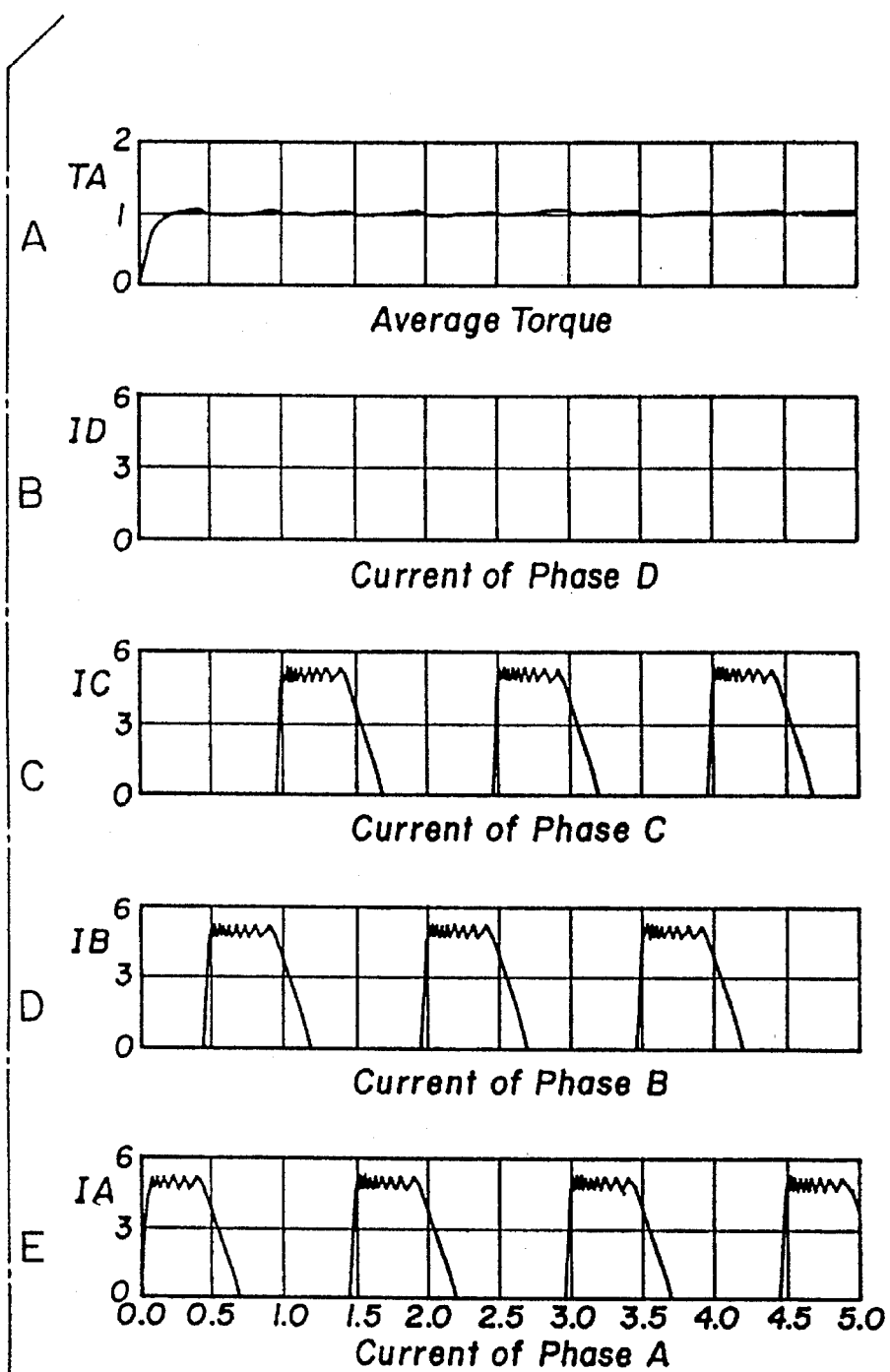
FIG. 6 illustrates a current commutation profile for the variable reluctance motor of FIG. 4 at a speed of 1000 rpm.

A comparative study of the commutation sequence and resulting torque output of the embodiment of FIG. 1 (shown in FIGS. 3 and 5, respectively) can be made with respect to FIG. 4 and FIG. 6, which respectively show commutation sequence and resulting torque output for a similar variable reluctance motor having an identical rotor and stator pole configuration but no full-pitch winding. It is clear in FIG. 4 and FIG. 6 that a considerable current remains in the short pitch windings of phases A–C after the respective phase alignments. Consequently, a lower overall torque output is generated.

It is noteworthy that the embodiment of FIG. 1 can be operated with reversed rotation simply by changing the current commutation sequence to:

A—C—B—A—C—B

In addition, the embodiment of FIG. 1 can be operated as an efficient generator by sequentially injecting the positive current into the respective short pitch windings of phases A–C as the inductance of the active phase decreases. Furthermore, a positive voltage must be applied to the full pitch winding 20 some time before next short pitch winding is energized in order to build up magnetic field. After the next sequential short pitch winding becomes active, the full pitch winding 20 is short circuited or connected to a negative voltage. Through the mutual inductance between the full pitch winding 20 and the short pitch windings of phases A–C, the current decrease in the full pitch winding 20 will accelerate the current increase in the active short pitch winding.

FIGS. 7–11 illustrate five alternative converter circuits for implementing the commutation sequences necessary for driving the variable reluctance motor of FIG. 1.

Figure 7:
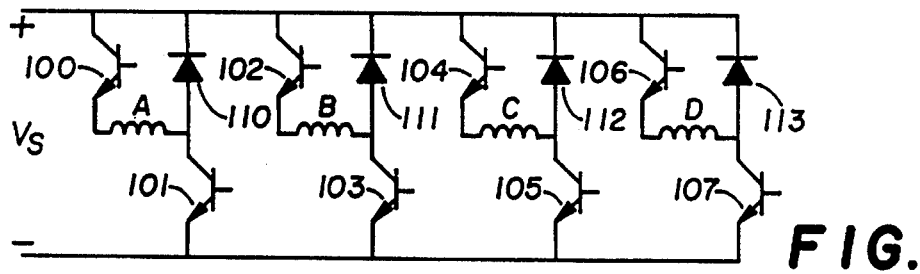
FIGS. 7–11 illustrate five alternative converter embodiments suitable for driving the variable reluctance motor of FIG. 1.

The converter configuration illustrated in FIG. 7 comprises four switch legs connected in parallel between positive (+) and negative (−) DC supply lines. Each switch leg comprises a pair of switch devices 100-101, 102-103, 104-105 and 106-107 with one of the four windings of phases A–D connected in series therebetween. In addition, each switch leg includes one of diodes 110-113 connected as shown between a terminal of the corresponding winding of phase A–D and the positive DC supply line.

During commutation, the pairs of switch devices 100-101, 102-103, and 104-105 are sequentially turned on before the inductance of the corresponding short pitch winding of phase A, B or C begins to increase. Turning on the respective switch devices 100-101, 102-103, and 104-105 injects a positive current into each of the corresponding short pitch windings of phases A–C. Similarly, the switch devices 101, 103, and 105 are sequentially turned off before the inductance of the short pitch windings A–C begins to decrease. Turning off switch devices 101, 103 and 105 short circuits the corresponding short pitch winding of phase A, B or C through diodes 110-113. For example, switch 101 is turned off some time before the inductance of phase A begins to decrease. The short pitch winding of phase A is short circuited through switch device 100 and diode 110 after switch device 101 is turned off. Then switch devices 106 and 107 are turned on and a positive voltage is applied to the full pitch winding 20 of phase D. As a result, the current decrease in the short pitch winding of phase A is accelerated by the current increase in the full-pitch winding 20 of phase D. After the current in the short pitch winding of phase A decays to zero, switches 100 and 107 are turned off. After the current in the full-pitch winding 20 of phase D decays to zero, switch 106 is turned off.

FIGS. 8–11 show alternative converter circuits which generate similar current commutation sequences.

Figure 8:
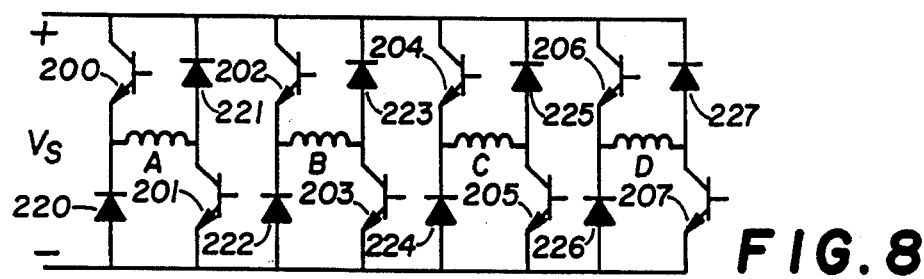

In the converter configuration shown in FIG. 8, each of the four switch legs comprises a pair of switch devices 200 & 201, 202 & 203, 204 & 205, and 206 & 207 having a corresponding one of the windings of phases A–D connected in series therebetween. The emitters of switch devices 200, 202, 204, and 206 are connected to the negative (−) supply line through corresponding diodes 220, 222, 224, and 226. The collectors of switch devices 201, 203, 205, and 207 are connected to the positive (+) supply line through corresponding diodes 221, 223, 225, and 227.

The above-described configuration of FIG. 8 can commutate the four windings of phases A–D by any one of the three techniques proposed in this invention. To apply a positive voltage to a phase winding, for example, phase A, the two switches 200 and 201 are turned on. To short circuit a phase winding, for example, phase A, either one of the two switches 200 or 201 is turned on and the other is turned off. To apply a negative voltage to a phase winding, for example, phase A, the two switches 200 and 201 are both turned off. The converter of FIG. 8 allows a faster current commutation because the active short-pitch windings of phases A–C can each be turned off with a negative voltage while a positive voltage is supplied to the full-pitch winding 20 of phase D. (If there is a good magnetic coupling between the active short pitch winding and the full-pitch winding 20, the current increase in one will cause a current decrease in the other due to the fact that the flux tends to be constant. Hence, applying a positive voltage to the full pitch winding 20 of phase D will accelerate the current increase in the full pitch winding 20. Consequently, the current decrease in the short pitch windings of phases A–C will be accelerated.)

Figure 9:
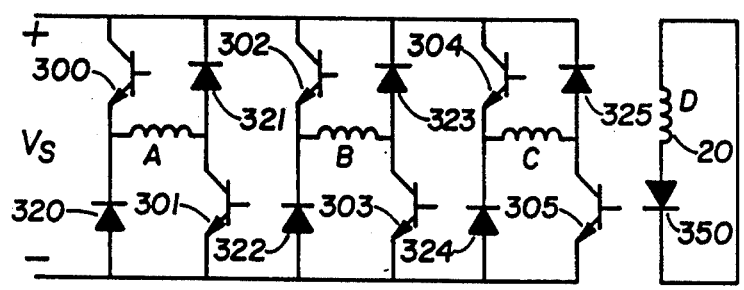

The converter configuration shown in FIG. 9 operates in much the same manner as that of FIG. 8. When an active short pitch winding is turned off, a negative voltage is applied to the active short pitch winding through the diodes 320-325 connected to the short pitch winding, and the full pitch winding of phase D is short circuited. For example, if switch device 300 and 301 are turned off in order to apply a negative voltage to the short pitch winding of phase A through the two diodes 320 and 321, then the induced voltage in the full pitch winding 20 will cause diode 350 to conduct and the full pitch winding 20 becomes short circuited through diode 350. The diode 350 blocks negative current in the full pitch winding 20 of phase D in order to prevent negative torque from being developed.

Figure 10:
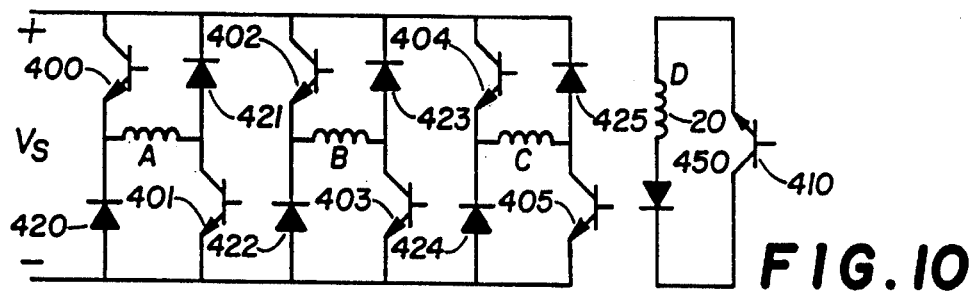

FIG. 10 illustrates a modification to the converter configuration shown in FIG. 9, and the operation of the converter of FIG. 10 is essentially the same as that in FIG. 9. To improve efficiency, switch device 410 is provided. Switch device 410 is turned on at the beginning of each current commutation period to short circuit the full pitch winding 20 of phase D. Switch device 410 is then turned off after the current in the full pitch winding 20 of phase D decays to zero and is kept off until the next current commutation begins. This way, full pitch winding 20 is not put into operation during the chopping periods of the short pitch windings of phase A–C, and as a result the efficiency of the variable reluctance motor is higher.

Figure 11:
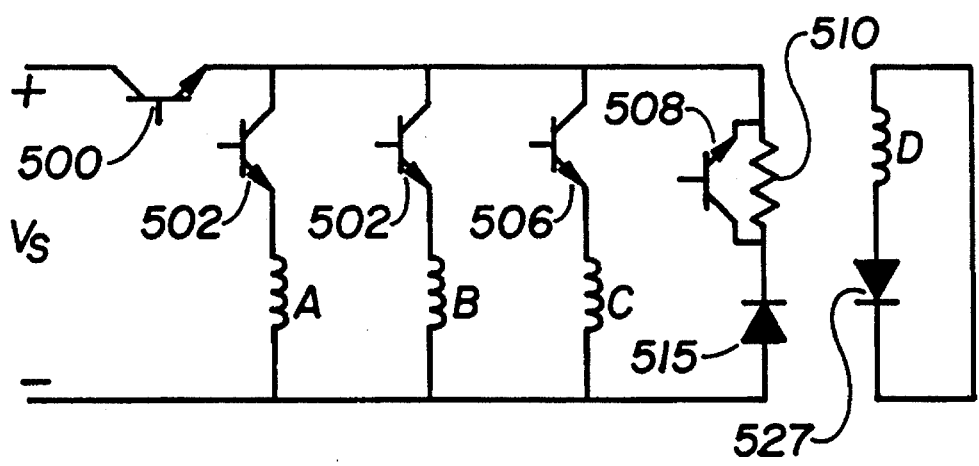

The converter shown in FIG. 11 comprises a DC voltage source $V_s$ which may be either a battery or a rectifier connected to an AC voltage source. The DC voltage source supplies positive (+) and negative (−) terminals. A switch device 500 is connected in series between the (+) terminal and four parallely connected switch legs. An isolated loop comprises a phase winding D and a diode 527. Three of the switch legs comprise one of switch devices 502, 504 and 506 connected in series with one of phase windings A–C. The fourth switch leg comprises diode 515 connected in series with a parallely connected switch device 508 and resistor 510.

During commutation, pairs of switch devices 500 & 502, 500 & 504, and 500 & 506 are sequentially turned on before the inductance of the corresponding winding of phases A, B, or C begins to increase and after the previous phase winding is fully turned off (the phase current reaches zero). Turning on the respective switch device pairs 500 & 502, 500 & 504, and 500 & 506 injects a positive current into the corresponding short pitch winding of phases A–C. When one of the three phases A–C needs to be turned off, switch devices 500 & 508 are turned off while the corresponding switch device 502, 504 or 506 is kept on. With switch device 508 being off, there is a voltage across the resistor 510 caused by the current in the active phase winding A–C. The voltage is a negative voltage which is needed to turn off the corresponding phase winding A–C, and it is applied to the winding A–C through diode 515 and the corresponding switch device 502, 504 or 506. During this turn-off process, the induced voltage in the phase winding D will cause diode 527 to conduct and the phase winding D becomes short circuited through diode 527. The diode 527 blocks negative current in the phase winding D in order to prevent negative torque from being developed. For example, if phase A needs to be turned off, then switch devices 500 and 508 are turned off while switch device 502 is kept on, and the current in phase A will flow through the resistor 510. As a result, a voltage drop will appear across the resistor 510, which voltage is applied to phase winding A through switch device 508 and diode 515. Current chopping may be realized by turning switch device 500 on and off repeatedly. To improve efficiency, switch device 508 is kept being on during the chopping process to prevent current from flowing through the resistor 510.

Figure 12:
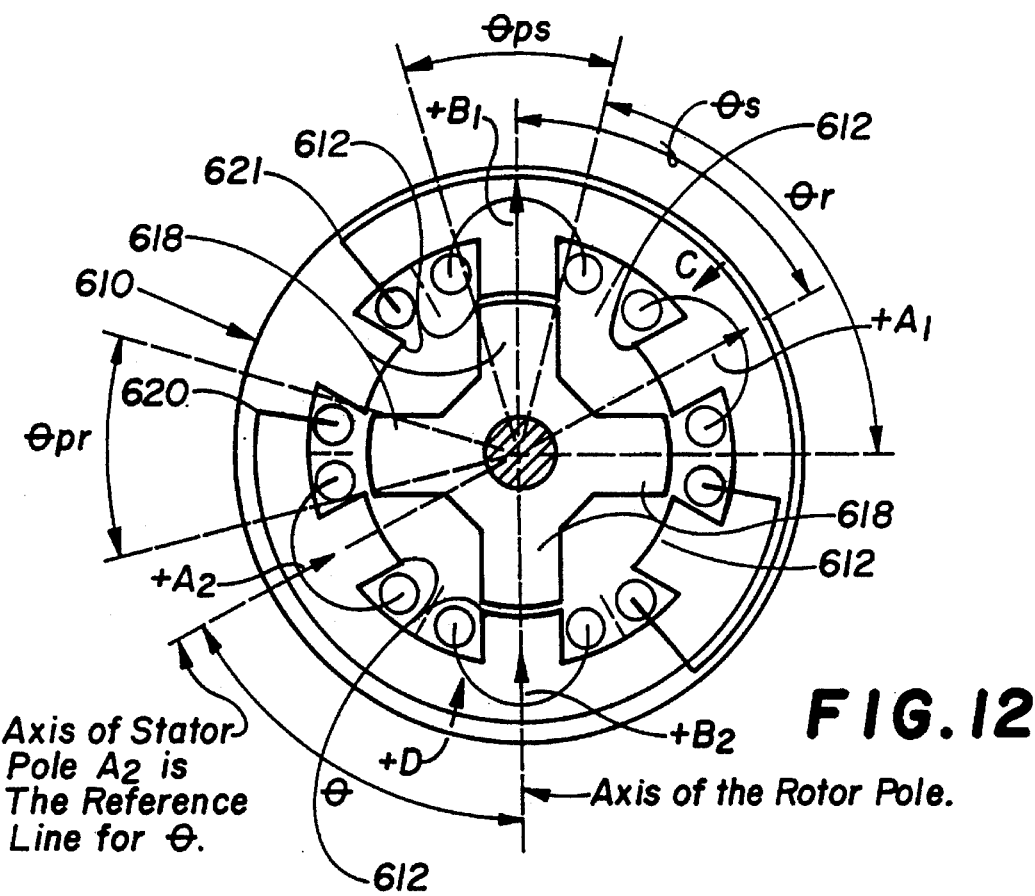
FIG. 12 is a cross-section of an alternative embodiment of the variable reluctance motor according to the present invention.

FIG. 12 illustrates an alternative embodiment of the variable reluctance motor of the present invention which incorporates two full pitch windings 620 and 621.

As shown in FIG. 12, the stator 610 comprises six salient (or projecting) poles 612 positioned at angular intervals $\theta_s$ of $\pi/3$. Each pole 612 has a pole arc $\theta_{ps}$ of $\pi/6$.

The rotor 616 also comprises four salient poles 618 positioned at angular intervals $\theta_r$ of $\pi/2$. Each pole 618 has a pole arc $\theta_{pr}$ with $\theta_{pr}$ being neither smaller than $\pi/6$ nor greater than $\pi/3$.

In the embodiment of FIG. 12, stator 610 is wound with only two short pitch windings corresponding to two phases A and B. Once again, each short pitch winding corresponding to phases A and B further comprise two short pitch coils, for example, coil $A_{1\ and\ 2}$ connected in series and wound around a corresponding pair of diametric stator poles 612 to yield an alternating phase sequence.

There is also a full pitch winding 621 corresponding to phase C and a full pitch winding 620 corresponding to phase D. The full pitch winding 621 corresponding to phase C is wound around a group of three adjoining stator poles 612 including those corresponding to phases A and B. Likewise, the full pitch winding 620 corresponding to phase D is wound around another group of three adjoining stator poles 612 including one which is also wound by the full pitch winding 620.

Current commutation for the embodiment of FIG. 12 is identical to that of FIG. 1 and the working principle is the same with one exception. The injecting of current in the full pitch winding 620 of phase D not only improves the current commutation of phase A–C, but also produces positive torque when phases C and D are energized and the mutual inductance between them is increasing.

Figure 13:
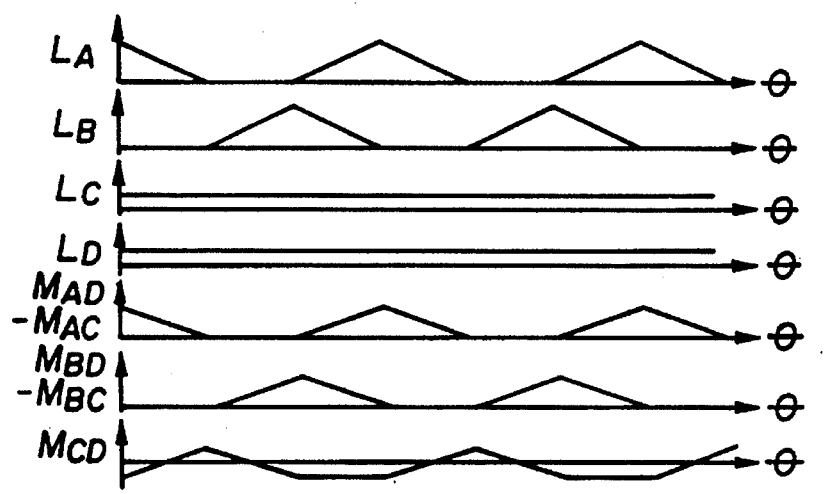
FIG. 13 shows the sequential inductance profile for the embodiment of FIG. 12.

As shown in FIG. 13, the inductance $L_D$ of the full pitch winding 620 remains constant. Hence, the full pitch winding 620 of phase D can not produce any torque by itself. However, the current in the full pitch winding 620 of phase D will, by mutual inductance, interact with the current in the full pitch winding 621 of phase C, and as a result, a torque will be developed. Specifically, if the current commutation sequence is CD—A—B— CD—A—B, commutation of phase A is the same as that of phase A in the embodiment shown in FIG. 1. However, the current commutation of phase B is different. After the current in phase B decreases to zero, the current in phase D is not decreased to zero as it is after phase A is turned off. Instead, the current in phase D is regulated at a desired value together with the current in phase C to produce torque. For phase C, it is turned on some time before the mutual inductance between phases C and D begins to increase and turned off some time before the mutual inductance begins to decrease. The current commutation of phase C is improved by the current in phase D. After the current in phase C is decreased to zero, the current in phase D will decrease to zero.

The general concept of the present invention is equally applicable to the field of linear motors, and each of the abovedescribed rotary embodiments can easily be adapted to a linear configuration.

Figure 14:
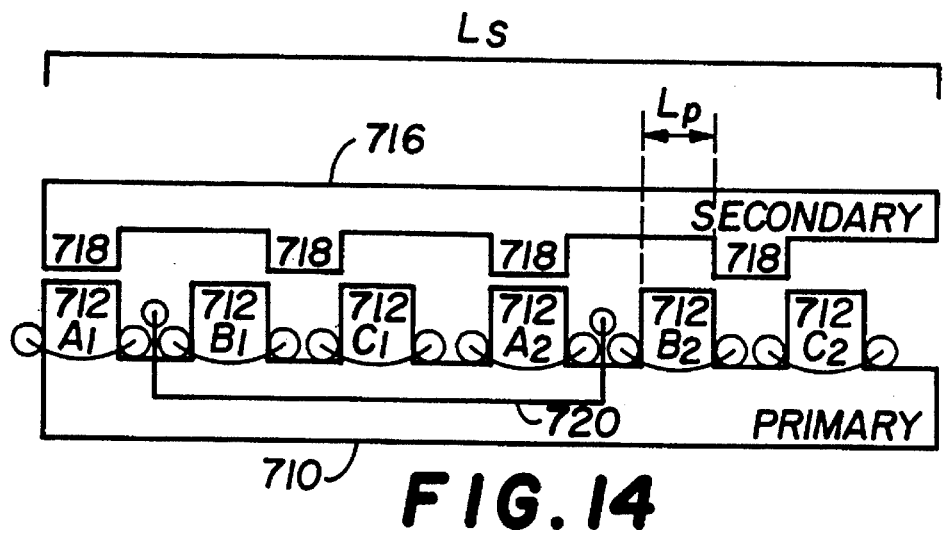
FIG. 14 illustrates one section of a linear embodiment which is a counterpart of the rotary variable reluctance motor of FIG. 1.

Specifically, FIG. 14 illustrates one section of a linear variable reluctance motor corresponding to the rotary embodiment of FIG. 1. Multiple sections may be combined to yield a linear variable reluctance motor of any length. The section of FIG. 14 includes a single primary 710 and a single secondary 716. The primary 710 has a number of salient poles 712, and secondary 716 has a number of salient poles 718. The poles 712 have a pole width $L_{pp}$ equal to $L_s/12$, and the poles 718 have a pole width $L_{ps}$ of between $L_s/12$ to $L_s/6$ where $L_s$ equals the total length of the section. The primary 710 is provided with six equally spaced salient poles 712, and the secondary 716 is provided with four equally spaced salient poles 718.

In the embodiment of FIG. 14, primary 712 is wound with three windings corresponding to three phases A–C. Each phase winding (for example, the winding of phase A) comprises two single-pole coils ($A_{1-2}$) connected in series and wound around a corresponding pair of poles 712.

There is also a single multi-pole winding 720 corresponding to a fourth phase D and wound around a group of three adjoining primary poles 712.

The commutating sequence, operation, and advantages of the linear variable reluctance motor of FIG. 14 are identical to those described with respect to the rotary embodiment of FIG. 1

Figure 15:
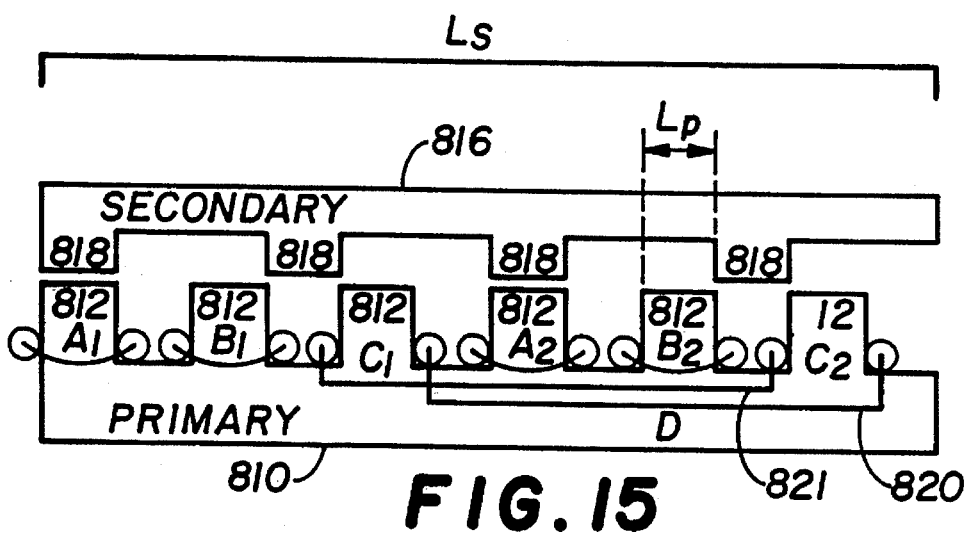
FIG. 15 illustrates one section of a linear embodiment which is a counterpart of the rotary variable reluctance motor of FIG. 12.

FIG. 15 illustrates one section of a linear variable reluctance motor corresponding to the rotary embodiment of FIG. 12. Again, multiple sections may be combined to yield a linear variable reluctance motor of any length. The section of FIG. 15 is structurally similar to that of FIG. 14, except that primary 812 is wound with only two phase windings corresponding to two phases A and B. Once again, each phase winding corresponding to phases A and B further comprises two single-pole coils, for example, coils $A_1$ and A2 connected in series and wound around a corresponding pair of primary poles 812 to yield an alternating phase sequence.

There is also a first multi-pole winding 821 corresponding to phase C and a second multi-pole winding 820 corresponding to phase D. The multi-pole winding 821 corresponding to phase C is wound around a group of three adjoining primary poles 812 two of which correspond to phases A and B. Likewise, the multi-pole winding 820 corresponding to phase D is wound around another group of three adjoining primary poles 812 including two which are also wound by the multi-pole winding 821 corresponding to phase C.

The commutating sequence, operation, and advantages of the linear variable reluctance motor of FIG. 15 are identical to those described with respect to the rotary embodiment of FIG. 12.

Figure 16:
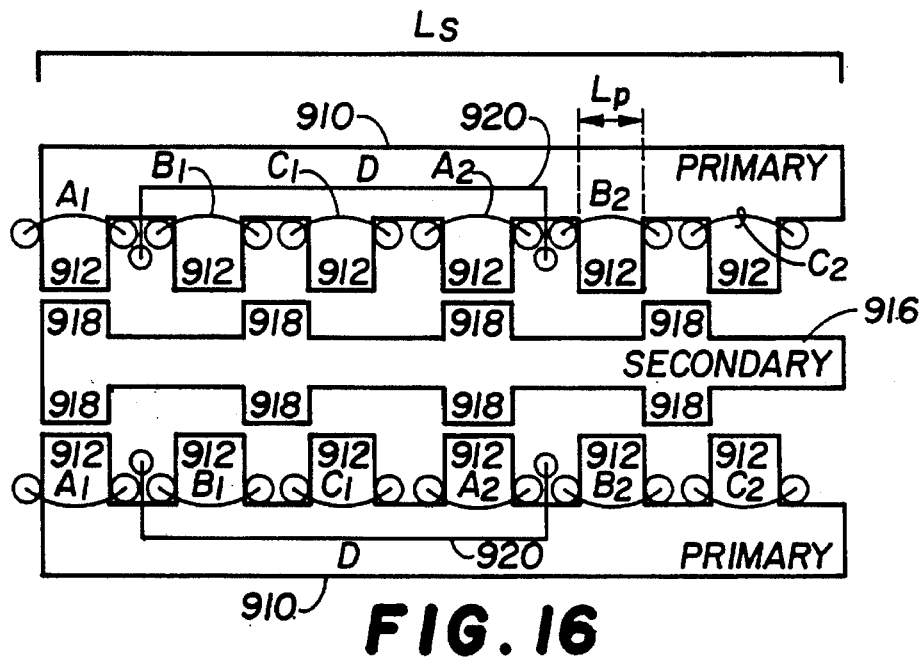
FIG. 16 illustrates an alternative embodiment of the linear variable reluctance motor section of FIG. 14.

FIG. 16 illustrates an alternative embodiment of the linear variable reluctance motor section of FIG. 14.

The section of FIG. 16 includes dual primaries 910 and 911, and a single secondary 916 positioned between dual primaries 910 and 911. The primaries 910 and 911 each have the same number of salient poles 912, and secondary 916 is provided with salient poles 918 projecting from opposing sides toward both of primaries 910 and 911. All of poles 912 have a pole width $L_{pp}$ equal to $L_s/12$, and poles 918 have a pole width $L_{ps}$ being of between $L_s/12$ to $L_s/6$ where $L_s$ equals the total length of the section. The primaries 910 and 911 are each provided with six equally spaced salient poles 912, and the secondary 916 is provided with four equally spaced salient poles 918 on each of its sides.

The embodiment of FIG. 16 is wound similarly to that of FIG. 14 such that the dual primaries 910 and 911 mirror each other.

The commutating sequence, operation, and advantages of the linear variable reluctance motor of FIG. 16 are the same as those for the embodiment of FIG. 14. The use of dual primaries 910 and 911 carry an additional benefit in that the net normal force acting on the secondary 916 is zero.

Figure 17:
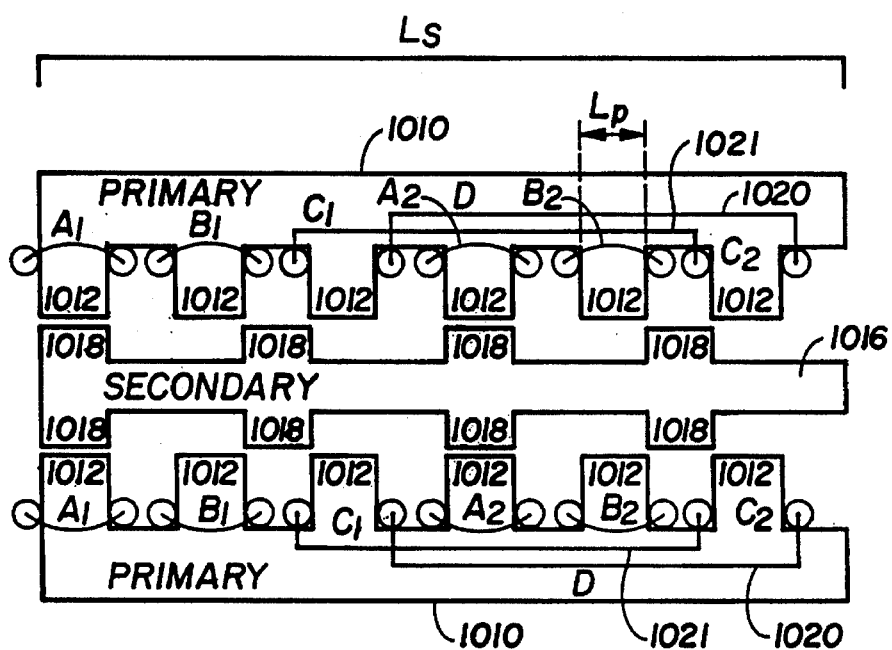
FIG. 17 illustrates one section of a linear variable reluctance motor as in FIG. 15 with the addition of dual primaries.

FIG. 17 illustrates a linear embodiment of the invention which incorporates dual primaries 1010 and 1011 in the embodiment shown in FIG. 15. Again, the use of dual primaries 1010 and 1011 eliminates any net normal force acting on the secondary 1016.

The embodiment of FIG. 17 is wound similarly to that of FIG. 15 such that the dual primaries 1010 and 1011 mirror each other.

The commutating sequence, operation, and advantages of the linear variable reluctance motor of FIG. 17 are the same as those for the embodiment of FIG. 15.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

We claim:

1. A method for commutating phases of a variable reluctance motor, said motor having a rotor with a plurality of salient poles, a stator with a plurality of salient poles, a plurality of short pitch phase windings each corresponding to a phase of said motor and each comprising a plurality of individual coils wound singly around said stator poles, and a full pitch winding wound collectively around a group of said stator poles, the method comprising:

applying a negative voltage to one of said short pitch phase windings to turn off said corresponding phase; and short circuiting said full pitch winding;

whereby a current in said short pitch winding is transferred to said full pitch winding via a mutual inductance between said short pitch winding and said full pitch winding, thereby accelerating a current decrease in said short pitch winding.

2. The method according to claim 1, wherein said step of applying a negative voltage to one of said short pitch phase windings and said step of short circuiting said full pitch winding are repeated for each one of said short pitch windings.

3. The method according to claim 1, wherein said rotor has four poles, and said stator has six poles, and said full pitch winding embraces three of said stator poles.

4. A method for commutating phases of a variable reluctance motor, said motor having a rotor with a plurality of salient poles, a stator with a plurality of salient poles, a plurality of short pitch phase windings each corresponding to a phase of said motor and each comprising a plurality of individual coils wound singly around said stator poles, and a full pitch winding wound collectively around a group of said stator poles, the method comprising:

short circuiting one of said short pitch phase windings to turn off said corresponding phase; and applying a positive voltage to said full pitch winding;

whereby a current in said short pitch winding is transferred to said full pitch winding via a mutual inductance between said short pitch winding and said full pitch winding, thereby accelerating a current decrease in said short pitch winding.

5. The method according to claim 4, wherein said step of short circuiting one of said short pitch phase windings and said step of applying a positive voltage to said full pitch winding are repeated for each one of said short pitch windings.

6. The method according to claim 4, wherein said rotor has four poles, and said stator has six poles, and said full pitch winding embraces three of said stator poles.

7. The method of claim 4, further including the step of providing a converter circuit for commutating a plurality of said short pitch windings and said commutating full pitch winding, said converter comprising:

a plurality of switch legs including a first switch leg through a fourth switch leg, each connected between a positive and a negative supply line of a DC voltage source, said first switch leg through said third switch leg further comprising a pair of switch devices and a pair of diodes having one of said short pitch windings connected in series therebetween.

8. A method for commutating phases of a variable reluctance motor, said motor having a rotor with a plurality of salient poles, a stator with a plurality of salient poles, a plurality of short pitch phase windings each corresponding to a phase of said motor and each comprising a plurality of individual coils wound singly around said stator poles, and a full pitch winding wound collectively around a group of said stator poles, the method comprising:

applying a negative voltage to one of said short pitch phase windings to turn off said corresponding phase; and applying a positive voltage to said full pitch winding;

whereby a current in said short pitch winding is transferred to said full pitch winding via a mutual inductance between said short pitch winding and said full pitch winding, thereby accelerating a current decrease in said short pitch winding.

9. The method according to claim 8, wherein said step of applying a negative voltage to one of said short pitch phase windings and said step of applying a positive voltage to said full pitch winding are repeated for each one of said short pitch windings.

10. The method according to claim 8, wherein said rotor has four poles, and said stator has six poles, and said full pitch winding embraces three of said stator poles.

11. The method of claim 8, further including the step of providing a converter circuit for commutating a plurality of said short pitch windings and said commutating full pitch winding, said converter comprising:

a plurality of switch legs including a first switch leg through a fourth switch leg, each connected between a positive and a negative supply line of a DC voltage source, said first switch leg through said third switch leg further comprising a pair of switch devices and a pair of diodes having one of said short pitch windings connected in series therebetween.

12. A method for commutating phases of a variable reluctance generator, said generator having a rotor with a plurality of salient poles, a stator with a plurality of salient poles, a plurality of short pitch phase windings each corresponding to a phase of said motor and each comprising a plurality of individual coils wound singly around said stator poles, and a full pitch winding wound collectively around a group of said stator poles, the method comprising:

a first step of applying a positive voltage to said full pitch winding to build a magnetic field; and a second step of applying a positive voltage to one of said short pitch phase windings to turn on said corresponding phase;

whereby a current in said full pitch winding is transferred to said short pitch winding via a mutual inductance between said short pitch winding and said full pitch winding, thereby accelerating a current increase in said short pitch winding.

13. The method according to claim 12, wherein said first step and said second step are consecutively repeated for each one of said short pitch windings.

14. The method according to claim 12, wherein said rotor has four poles, and said stator has six poles, and said full pitch winding embraces three of said stator poles.

15. The method of claim 12, further including the step of providing a converter circuit for commutating a plurality of said short pitch windings and said commutating full pitch winding, said converter comprising:

a plurality of switch legs including a first switch leg through a fourth switch leg, each connected between a positive and a negative supply line of a DC voltage source, said first switch leg through said third switch leg further comprising a pair of switch devices and a pair of diodes having one of said short pitch windings connected in series therebetween.

16. A method for commutating phases of a variable reluctance generator, said generator having a rotor with a plurality of salient poles, a stator with a plurality of salient poles, a plurality of short pitch phase windings each corresponding to a phase of said motor and each comprising a plurality of individual coils wound singly around said stator poles, and a full pitch winding wound collectively around a group of said stator poles, the method comprising:

a first step of applying a positive voltage to said full pitch winding to build a magnetic field; and a second step of applying a positive voltage to one of said short pitch phase windings to turn on said corresponding phase, and short-circuiting said full pitch winding;

whereby a current in said short-circuited full pitch winding is transferred to said short pitch winding via a mutual inductance between said short pitch winding and said full pitch winding, thereby accelerating a current increase in said short pitch winding.

17. The method according to claim 16, wherein said first step and said second step are consecutively repeated for each one of said short pitch windings.

18. The method according to claim 16, wherein said rotor has four poles, and said stator has six poles, and said full pitch winding embraces three of said stator poles.

19. A variable reluctance drive system comprising:
a rotor having four salient poles spaced at equal angular intervals;
a stator having six salient poles spaced at equal angular intervals, said stator further having three short pitch windings each comprising two short pitch coils wound around individual diametric stator poles, the three short pitch windings corresponding to a first, a second and a third phase, respectively, and one full pitch commutating winding wound around three adjacent stator poles and operative via a mutual inductance with said short pitch windings, each two short pitch coils corresponding to one of said first, second, and third phases being separated by two adjacent short pitch coils corresponding to another two of said first, second and third phases, said full pitch commutating winding corresponding to a fourth phase; and
a converter circuit including a plurality of switch legs each connected to a DC voltage source.

20. The variable reluctance drive system according to claim 19, wherein said DC voltage source is a battery.

21. The variable reluctance drive system according to claim 19, wherein said DC voltage source comprises a rectifier connected to an AC voltage source.

22. The variable reluctance drive system according to claim 19, wherein said plurality of switch legs further comprise a first switch leg through a third switch leg, each comprising a first and a second transistor, each said transistor having a collector terminal and an emitter terminal, each of said short pitch windings having a first end and a second end, the first transistor of said first switch leg through third switch leg being coupled to a positive supply line of said DC voltage source by the collector terminal, and the second transistor of said first switch leg through third switch leg being coupled to a negative supply line of said DC voltage source by the emitter terminal, one of the short pitch windings being connected by the first end to the emitter terminal of said first transistor, and by the second end to the collector terminal of the second transistor.

23. The variable reluctance drive system according to claim 22, wherein said first switch leg through third switch leg each further comprises a diode connected between the positive supply line of said DC voltage source and the second end of said short pitch winding.

24. The variable reluctance drive system of claim 23, further including a diode coupled between the negative supply line of said DC voltage source and the first end of said short pitch winding.

25. The variable reluctance drive system according to claim 19, wherein said plurality of switch legs further comprises a first switch leg through a fourth switch leg, each comprising a first and a second transistor, each of said transistors having a collector terminal and an emitter terminal, said first switch leg through said third switch leg each further comprising one of said short pitch windings, and said fourth switch leg further comprising a full pitch winding, each of said short pitch windings and the full pitch winding having a first and a second end, respectively, said collector terminal of said first transistor of said first through fourth switch legs being coupled to a positive supply line of said DC voltage source, said emitter terminal of said second transistor of said first through fourth switch legs being coupled to a negative supply line of said DC voltage source, each of said short pitch windings and the full pitch winding being connected by the first end to the emitter terminal at the respective first transistor and by the second end to the collector terminal of the respective second transistor.

26. The variable reluctance drive system according to claim 25, wherein said fourth switch leg further comprises a diode connected between the positive supply line of said DC voltage source and said second end of said full pitch winding, and another diode connected between a negative supply line of said DC voltage source and said first end of said full pitch winding, and wherein said first through third switch legs each comprises a diode connected between the positive supply line of said DC voltage source and said second end of said short pitch winding, and a further diode connected between the negative supply line of said DC voltage source and said first end of said short pitch winding.

27. The variable reluctance drive system of claim 26, further including a diode connected between the negative supply line of said DC voltage source and the first end of said full pitch winding.

28. A method for commutating phases of a variable reluctance motor, said motor having a rotor with a plurality of salient poles, a stator with a plurality of salient poles, a plurality of short pitch phase windings each corresponding to a phase of said motor and each comprising a plurality of individual coils wound singly around said stator poles, and a full pitch winding wound collectively around a group of said stator poles, the method comprising:
applying a negative voltage to one of said short pitch phase windings to turn off said corresponding phase; and
short circuiting said full pitch winding;
whereby a current in said short pitch winding is transferred to said full pitch winding via a mutual inductance between said short pitch winding and said full pitch winding, thereby accelerating a current decrease in said short pitch winding and providing a
converter circuit for commutating said short pitch windings and said full pitch winding, said converter comprising:
a plurality of switch legs including a first switch leg through a fourth switch leg each connected between a positive and negative supply line of a DC voltage source, said first switch leg through said third switch leg further comprising a pair of switch devices and a pair of diodes having one of said short pitch windings connected in series therebetween.

29. The converter circuit according to claim 28, wherein said DC voltage source is a battery.

30. The converter circuit according to claim 28, wherein said DC voltage source comprises a rectifier connected to an AC voltage source.

31. The converter circuit according to claim 29, wherein said fourth switch leg comprises a pair of switch devices and a pair of diodes having said full pitch winding connected in series therebetween.

32. The converter circuit according to claim 29, wherein said fourth switch leg comprises a diode connected in series with said full pitch winding.

33. The converter circuit according to claim 29, wherein said fourth switch leg comprises a diode and a switch connected in series with said full pitch winding.

34. A converter circuit for commutating a plurality of short pitch windings and a commutating full pitch winding of a switched reluctance motor, said full pitch winding having mutual inductance with said short pitch windings, said converter comprising:
a plurality of switch legs including a first switch leg through a fourth switch leg each connected in parallel, said first switch leg through said third switch leg further comprising a transistor, an emitter terminal of the transistor being connected in series with a first end of one of said short pitch windings, wherein in said parallel-connected first switch leg through said third switch leg the transistor is connected by its collector terminal to a positive supply line of a DC voltage source through a first switch device, wherein a second end of said one of said short pitch windings being connected to a negative supply line of the DC voltage source, wherein said fourth switch leg comprises a diode connected in series to a parallely-connected second switch device and a resistor, wherein said diode is connected to the negative supply line of the DC voltage source, and wherein said parallely-connected second switch device and the resistor are connected to the positive supply line of the DC voltage source through the first switch device.

35. The converter circuit according to claim 34, wherein said DC voltage source is a battery.

36. The converter circuit according to claim 34, wherein said DC voltage source comprises a rectifier connected to an AC voltage source.

37. The converter circuit according to claim 34, wherein said full pitch winding is connected in series to a diode closed loop.

* * * * *